US011078970B2

(12) United States Patent
Li et al.

(10) Patent No.: US 11,078,970 B2
(45) Date of Patent: Aug. 3, 2021

(54) TRANSMISSION WITH SELECTABLE ONE-WAY CLUTCH

(71) Applicant: Ford Global Technologies, LLC, Dearborn, MI (US)

(72) Inventors: Dongdong Dee Li, Canton, MI (US); Stephen Michael Cicala, Dearborn Heights, MI (US); Conor Edward Sullivan, Canton, MI (US); Richard Reynolds Hathaway, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 16/525,810

(22) Filed: Jul. 30, 2019

(65) Prior Publication Data

US 2020/0032863 A1   Jan. 30, 2020

Related U.S. Application Data

(60) Provisional application No. 62/711,684, filed on Jul. 30, 2018.

(51) Int. Cl.
| | |
|---|---|
| *F16D 48/06* | (2006.01) |
| *F16D 21/00* | (2006.01) |
| *F16D 47/04* | (2006.01) |
| *F16D 41/00* | (2006.01) |
| *F16D 67/02* | (2006.01) |
| *B60T 1/00* | (2006.01) |

(52) U.S. Cl.
CPC ............. *F16D 48/06* (2013.01); *B60T 1/005* (2013.01); *F16D 21/00* (2013.01); *F16D 41/00* (2013.01); *F16D 47/04* (2013.01); *F16D 67/02* (2013.01); *F16D 2500/10412* (2013.01); *F16D 2500/10493* (2013.01); *F16D 2500/30406* (2013.01); *F16D 2500/3102* (2013.01); *F16D 2500/3108* (2013.01)

(58) Field of Classification Search
CPC .... F16D 41/00–36; F16D 47/04; F16D 67/02; F16D 2500/10493; F16D 2500/5104; F16D 2500/70426; F16D 2500/30406; F16H 61/0204; F16H 61/0246; F16H 61/04; F16H 61/0403; F16H 2061/0407; F16H 2061/044; F16H 2061/0462
See application file for complete search history.

(56) References Cited

U.S. PATENT DOCUMENTS

| | | |
|---|---|---|
| 4,588,059 A | 5/1986 | Miki et al. |
| 7,743,678 B2 | 6/2010 | Wittkopp et al. |
| 2010/0063698 A1* | 3/2010 | Lee ...................... F16H 61/686 701/67 |

(Continued)

*Primary Examiner* — Ernesto A Suarez
*Assistant Examiner* — Lillian T Nguyen
(74) *Attorney, Agent, or Firm* — David B. Kelley; Brooks Kushman P.C.

(57) ABSTRACT

A vehicle transmission includes a plurality of friction clutches and a selectable one-way clutch. The transmission also includes a controller programmed to, in response to detecting a component fault, switch the selectable one-way clutch from a passive state to an active state by commanding engagement of a first subset of the friction clutches to establish a slip elimination state. The controller is also programmed to, following establishment of the slip elimination state, command the selectable one-way clutch to the active state.

19 Claims, 2 Drawing Sheets

(56) References Cited

U.S. PATENT DOCUMENTS

| | | | |
|---|---|---|---|
| 2011/0297505 A1* | 12/2011 | Heuver | B60W 10/182 |
| | | | 192/219.5 |
| 2012/0010794 A1* | 1/2012 | Sahashi | F16H 61/12 |
| | | | 701/58 |
| 2016/0356377 A1* | 12/2016 | Bird | F16D 48/00 |
| 2018/0015917 A1* | 1/2018 | Itagaki | B60K 6/445 |
| 2018/0119806 A1* | 5/2018 | Armstead | F16H 3/66 |

* cited by examiner

TRANSMISSION WITH SELECTABLE ONE-WAY CLUTCH

CROSS REFERENCE TO RELATED APPLICATION

This application claims the benefit of U.S. provisional application Ser. No. 62/711,684, filed on Jul. 30, 2018, the disclosure of which is hereby incorporated in its entirety by reference herein.

TECHNICAL FIELD

This disclosure relates to the field of transmissions for motor vehicles. The disclosure further pertains to a transmission having a selectable one-way clutch and a method of operating the transmission to facilitate engagement of the selectable one-way clutch in the presence of a sensor fault.

BACKGROUND

Many vehicles are used over a wide range of vehicle speeds, including both forward and reverse movement. Most types of internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

SUMMARY

A vehicle transmission includes a plurality of friction clutches and a selectable one-way clutch. The transmission also includes a controller programmed to, in response to detecting a component fault, switch the selectable one-way clutch from a passive state to an active state by commanding engagement of a first subset of the friction clutches to establish a slip elimination state. The controller is also programmed to, following establishment of the slip elimination state, command the selectable one-way clutch to the active state. The controller is further programmed to release a second subset of the first subset of friction clutches after commanding the selectable one-way clutch to the active state.

A vehicle transmission includes a plurality of friction clutches an output brake and a selectable one-way clutch. The transmission also includes a controller programmed to, in response to a component fault, switch the selectable one-way clutch from a passive state to an active state by commanding engagement of the output brake and a first subset of the friction clutches to establish a slip elimination state. The controller is also programmed to, following establishment of the slip elimination state, command the selectable one-way clutch to the active state.

A vehicle transmission includes a plurality of friction clutches, an output brake, and a selectable one-way clutch. The transmission also includes at least one speed sensor to output a signal indicative of speed across the selectable one-way clutch. The transmission further includes a controller programmed to change state of the selectable one-way clutch by commanding the selectable one-way clutch to the active state only after sensing the speed across the selectable one-way clutch is less than a predetermined threshold in the absence of a component fault. The controller is also programmed to, in response to detection of a component fault, command engagement of at least one of the output brake and a first subset of the friction clutches to establish a slip elimination state before commanding the selectable one-way clutch to the active state.

DETAILED DESCRIPTION

Figure 1:
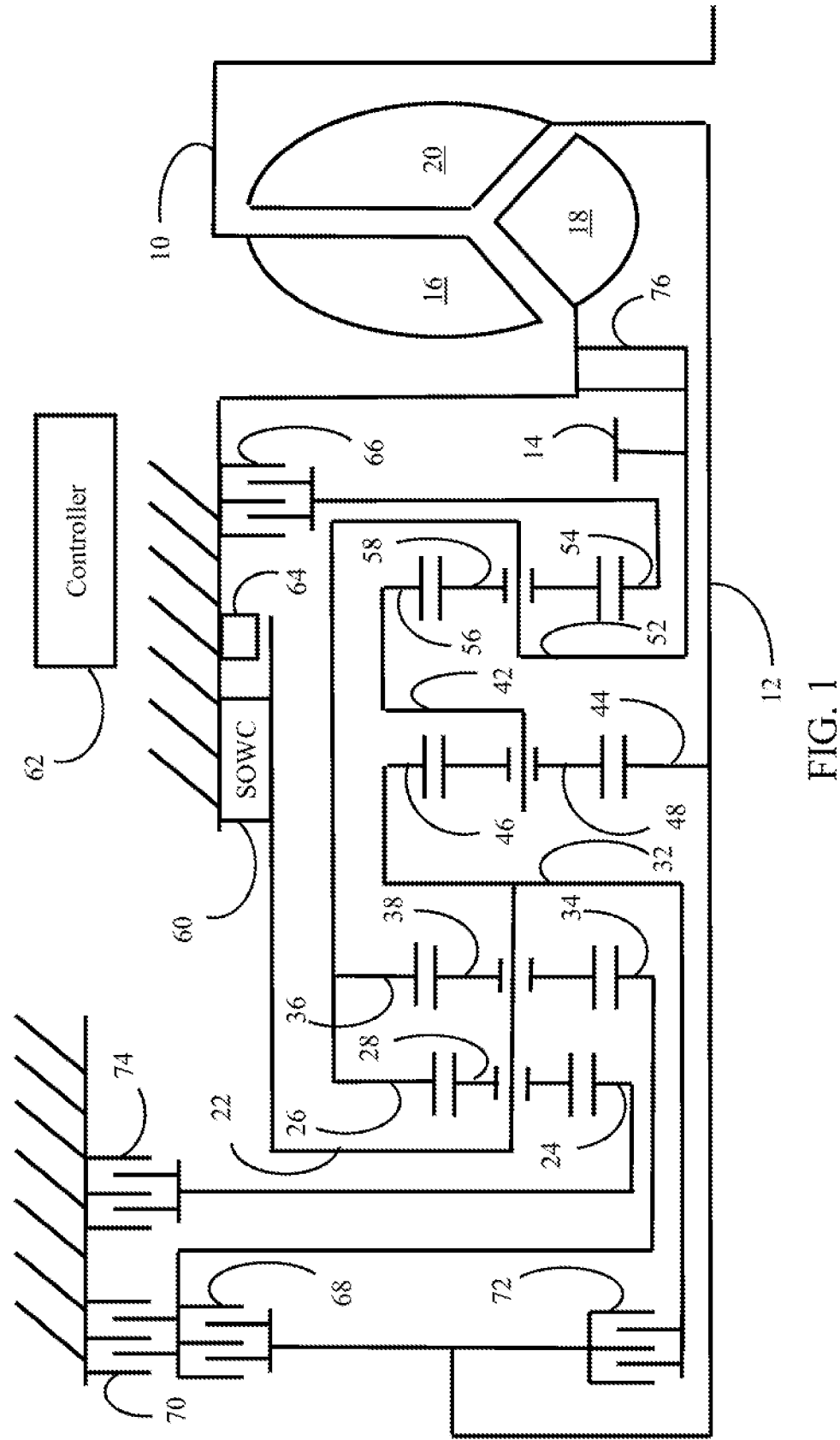
FIG. 1 is schematic diagram of a transmission.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Transmissions may utilize friction clutches and brakes engaged in different combinations to establish different power flow paths having different speed ratios. One type of friction clutch is a wet multi-plate clutch. A clutch pack may include a set of friction plates splined to one component and interleaved with a set of separator plates splined to a different component. To engage the clutch, pressurized fluid is supplied to an apply chamber forcing a piston to squeeze the friction plates between the separator plates. Friction between the friction plates and separator plates prevents relative rotation, thereby coupling the two components to each other. When the fluid pressure is reduced, a return spring forces the piston away from the clutch pack removing the normal force such that relative rotation is possible with minimal drag.

Transmissions may also use one-way clutches that passively prevent relative rotation between two components in one direction while permitting relative rotation in the opposite direction. An actively controlled one-way clutch includes selectable states such as permitting relative rotation in both directions or preventing relative rotation in both directions.

According to some examples, a transmission includes a selectable one-way clutch. Before commanding the selectable one-way clutch to transition from a passive state to an active state, a controller is programmed to ensure that there is very little, or no slip across the selectable one-way clutch. This may be accomplished by engaging friction clutches to eliminate the slip and using one or more speed sensors to confirm that slip has been eliminated. In the presence of a fault of either a friction clutch or a speed sensor, the controller commands engagement of additional friction clutches to establish a slip elimination state. While in the slip elimination state, it is safe to command the selectable one-way clutch to active state without confirmation from a speed sensor or risk of damage to internal components.

FIG. 1 is a schematic diagram of a transmission gearbox and torque converter. Only the top half of the gearbox and torque converter are shown because most of the components are axisymmetric. A transmission input shaft 10 is driveably connected to a power source such as an internal combustion engine. Power is transferred from transmission input shaft 10 to turbine shaft 12 by the torque converter. Power is then transferred from the turbine shaft 12 to an output element 14 by the gearbox. Power is transferred from output element 14 to vehicle driving wheels via a final drive mechanism, differential, and axle (not shown). Although power flows primarily from the engine to the driving wheels, there are some operating conditions, such as coasting on downhill grades in which power flows in the opposite direction.

The torque converter includes an impeller 16, a stator 18, and a turbine 20. The impeller is fixed to input shaft 10. The stator 18 is attached to the transmission case via a one-way clutch. The turbine 20 is fixed to turbine shaft 12. Impeller 16 acts as a centrifugal pump propelling fluid in a toroidal pattern. When the impeller speed exceeds the turbine speed, the flowing fluid encounters blades of the turbine imparting a torque on the turbine. The stator 18 redirects the flow exiting the turbine and directs it back into the impeller. When the impeller spins substantially faster than the turbine, the torque exerted on the turbine is a multiple of the torque exerted by the impeller. The torque converter allows the engine to rotate and exert torque on the turbine shaft even when the turbine shaft is stationary or moving backwards. This characteristic is very useful for initiating vehicle movement from a standstill.

The gearbox includes four simple planetary gearsets, each having carriers 22, 32, 42, and 52; sun gears 24, 34, 44, and 54; ring gears 26, 36, 46, and 45; and planet gears 28, 38, 48, and 58. The sun gears, ring gears, and carriers are all supported for rotation about a central axis. Each planet gear is supported for rotation with respect to the respective carrier and meshes with the respective sun gear and ring gear. Turbine shaft 12 is fixed to sun gear 44. Output element 14 is fixed to carrier 54, ring gear 26, and ring gear 36. Carrier 22, carrier 32, and ring gear 46 are mutually fixed. Carrier 42 is fixed to ring gear 56.

The gearbox also includes a clutch system including five friction clutches and one selectable one-way clutch. Each clutch selectively couples two elements. In this document, the term clutch includes devices that selectively couple a rotatable element to the transmission case, sometimes called brakes. When a clutch is in an engaged state, torque may be transmitted from one of the two elements to the other selectively coupled element. When a clutch is in a fully engaged state, the rotational speeds of the two elements are constrained to be equal. A friction clutch may be in partially engaged state in which the speeds are not equal but torque is transferred between the elements. When a clutch is in a disengaged state, the element speeds may differ and very little torque is transferred (only parasitic drag).

Selectable one-way clutch (SOWC) 60 selectively couples carriers 22 and 32 and ring gear 46 to the transmission case. SOWC 60 has a passive state and an active state. In the passive state, relative rotation is prevented in one direction but allowed in the opposite direction. The disengaged state on SOWC 60 may be referred to as an overrunning state. In the active state, SOWC 60 prevents relative rotation in both directions. In other words, in the active state, it is always fully engaged. Unlike a friction clutch, SOWC 60 is not designed to operate in a partially engaged state. When SOWC 60 transitions from the passive state to the active state, any relative rotation is suddenly eliminated, which can create uncomfortable sensations for vehicle occupants and may cause component faults. Therefore, the transmission controller 62 is programmed not to command such a transition unless the slip across SOWC 60 is very low (less than 20 rpm). The slip may be measured by a speed sensor 64. Alternatively, the slip may be calculated based on other speed sensors. In some examples, the controller 62 is programmed to detect a component fault based on a speed sensor reading inconsistent with a commanded clutch engagement state. SOWC 60 may not respond to a command to switch from active state to passive state while it is transmitting torque against the direction in which rotation would be allowed in passive state. Therefore, controller 62 needs to relieve such torque before commanding such a transition.

Friction clutch 66 selectively couples sun gear 54 to the transmission case. Friction clutch 68 selectively couples turbine shaft 12 to sun gear 34. Friction clutch 70 selectively couples sun gear 34 to the transmission case. Friction clutch 72 selectively couples turbine shaft 12 to carrier 22, carrier 32, and ring gear 46. Friction clutch 74 selectively couples sun gear 24 to the transmission case. Various speed ratios between turbine shaft 12 and output element 14 are established by fully engaging the clutches in combinations of two as shown in TABLE 1. Each of clutch 66, clutch 70, and clutch 74 that selectively couple various components to the transmission case may function as output brakes when engaged.

TABLE 1

|  | 66 | 68 | 70 | 60 | 72 | 74 | Speed Ratio |
|---|---|---|---|---|---|---|---|
| 1st | X |  |  | Passive |  |  | 4.484 |
| 1M | X |  |  | Active |  |  | 4.484 |
| 2nd | X |  |  |  |  | X | 3.146 |
| 3rd | X |  | X |  |  |  | 2.872 |
| 4th | X | X |  |  |  |  | 1.842 |
| 5th | X |  |  |  | X |  | 1.414 |
| 6th |  | X |  |  | X |  | 1.000 |
| 7th |  |  | X |  | X |  | 0.742 |
| 8th |  |  |  |  | X | X | 0.616 |
| Reverse |  | X |  | Active |  |  | −2.882 |

The speed ratio is the same in $1^{st}$ gear and in 1M. However, in $1^{st}$ gear, the transmission only transmits torque from the engine to the vehicle wheels. If the driver releases the accelerator pedal while coasting forward, SOWC 60 will overrun and the engine speed will fall to idle. In the 1M gear state, on the other hand, SOWC 60 is in the ACTIVE state, so torque can be transmitted from the vehicle wheels to the engine resulting in engine braking. In Reverse, SOWC 60 must be in the active state in order to transmit power from the engine to the vehicle wheels.

In Park, a parking pawl 76 is engaged to hold the vehicle stationary. Unlike friction clutches 66-74, parking pawl 76 is designed to remain engaged indefinitely with power consumption. In some vehicles, parking pawl 76 may be mechanically linked to the shift selector. In other vehicles, it may be under the controller of controller 62. In either case, there may be sensors which indicate the current status of parking pawl 76 to controller 62.

Figure 2:
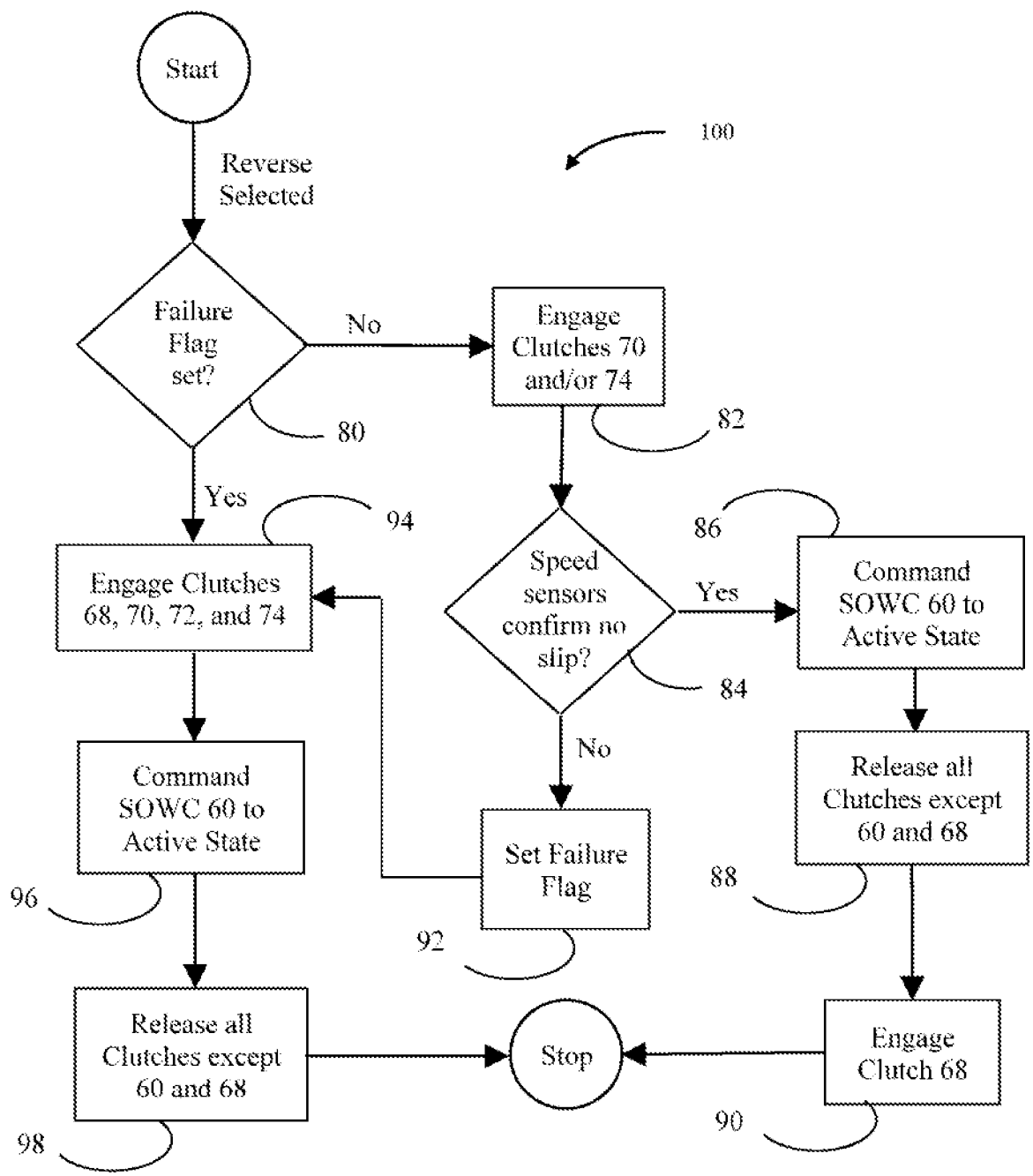
FIG. 2 is a flowchart for a process of robustly engaging reverse in the transmission of FIG. 1 in the presence of clutch or sensor faults.

FIG. 2 illustrates method 100 that provides a robust process for engaging reverse mode when SOWC 60 is currently in the passive state. The selectable one-way clutch is switched from a passive state to an active state is performed in response to selection of a reverse mode by a vehicle driver. This process ensures that there is no slip across SOWC 60 when it is commanded into the active state, even in the presence of a non-performing friction clutch or speed sensor. This process is initiated with the transmission in a neutral gearbox state (which can occur when the shift selector is placed in either Neutral or Park) with all friction clutches disengaged. This procedure is used when the vehicle is stationary. Modifications may be necessary if the vehicle is rolling. The engine would generally be idling, although the process does not depend on engine power as long as some source of pressurized fluid is available for clutch control. With the engine running and the gearbox in neutral, many of the gearbox components rotate. The speeds of these components are not dictated by the clutch state, but may be measured by speed sensors.

At step 80, the controller checks a flag that would indicate the presence of a faulted component. This flag may have been set by a previous execution of this procedure or may have been set by a different procedure. If the flag is not set, indicating no known fault, the controller engages clutch 70 or clutch 74 at step 82. Engagement of either of these two clutches makes the slip across SOWC 60 proportional to vehicle speed, which is zero when the vehicle is stationary. If the vehicle is moving, engaging these two clutches together forces the vehicle to stop and establishes a condition in which carrier 22/32 is held stationary, eliminating slip across SOWC 60. In some examples, the controller is programmed to, in response to vehicle being in motion, command engagement of the output brake and a first subset of the friction clutches after the vehicle comes to rest.

At step 84, the controller checks the output of speed sensors to confirm that slip across SOWC 60 has, in fact, been eliminated. Elimination of slip means that the speed of carrier 22/32 is less than a threshold, such as 20 rpm, at which commanding active state is safe. Even a properly functioning speed sensor may not be able to accurately measure extremely low speeds. If confirmation is available at step 84, then the controller commands SOWC 60 to the active state at step 86. Once SOWC 60 is in the active state, clutches 70 and 74 are no longer needed and are released at step 88. Finally, the controller completes the engagement of reverse by engaging clutch 68 at step 90.

There are multiple types of faults that may prevent confirmation of a no slip condition at step 84. For example, a speed sensor may have faulted such that, even though slip is zero, a non-zero slip is indicated or no reading at all is available. On the other hand, one of the clutches may have mis-engaged such that slip beyond a designated level for engagement of SOWC 60 without damage is present. If no confirmation is available at step 84, the controller sets the fault flag at step 92.

Whether a fault is first detected at step 84 or previously set as indicated at step 80, the controller proceeds to engage reverse in a fault tolerant manner. At step 94, the controller commands engagement of clutches 68, 70, 72, and 74. Any two of these clutches is sufficient to eliminate slip if the vehicle is stationary. In the absence of confirmation that the vehicle is stationary, any three of these clutches is sufficient to eliminate slip across SOWC 60. As previously discussed, engaging clutches 70 and 74 eliminates the slip independent of engagement of any other clutches. Therefore, fault of either of clutches 68 or 72 to engage when commanded would not result in slip in this state. Note that the combination of clutches 68 and 72 force all of the rotatable elements of the transmission to have the same rotational speed (a direct drive condition). When clutch 68 and clutch 72 are engaged in combination with at least one of the clutches 66, 70, or 74 that operate as output brakes, all of the elements are held against rotation. A gear state in which all rotatable elements are held stationary is called a full tie-up condition. Slip across a SOWC will always be zero during a full tie-up condition. Therefore, slip would be eliminated in this state even if one of clutches 70 and 74 mis-engages. In some alternative examples other locking mechanisms such as a pawl may be employed to operate as an output brake as described herein.

At step 96, SOWC 60 can be safely commanded to the active state without speed sensor feedback. At step 98, all clutches except 60 and 68 are released, establishing the reverse gear ratio. That is, the controller may be programmed to change engage the active state of the selectable one-way clutch by commanding the selectable one-way clutch to the active state only after sensing the speed across the selectable one-way clutch is less than a predetermined threshold in the absence of a component fault. The controller is also programmed to, in response to detection of a component fault, commanding engagement of a first subset of the friction clutches to establish a slip elimination state before commanding the selectable one-way clutch to engage the active state.

The choice of clutches 68, 70, 72, and 74 at step 94 may not be exclusive. Other choices may be possible with the arrangement of FIG. 1 and multiple choices would be possible in other gearing arrangements. The choice must result in a slip elimination clutch state, defined as a combination of n clutches such that engagement of every subset of n−1 of the clutches eliminates slip across a SOWC. For a gearbox that requires engagement of m clutches to establish each gear ratio (including passive and selectable one-way clutches), most combinations of m+1 clutches create a full tie-up and therefore eliminate slip across any SOWC. Therefore, most combinations of m+2 clutches would result in slip elimination state, but each such combination would have to be analyzed to verify that it satisfies the definition. Note that any combination of a subset of friction clutches, a parking pawl, or vehicle wheel brakes may be regarded as an output brake in a broad sense when applied to the output element in this analysis.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle transmission comprising:
a plurality of friction clutches;
a selectable one-way clutch; and
a controller programmed to
responsive to a component fault, command an engagement of a first subset of the friction clutches to establish a slip elimination state, then command the selectable one-way clutch to switch from a passive state to an active state, wherein in the passive state, the selectable one-way clutch prevents relative rotation between two components on each side in one direction while permitting relative rotation between the two components in an opposite direction, and wherein in the active state, the selectable one-way clutch prevents relative rotation between the two components in either direction, and
after commanding the selectable one-way clutch to the active state, release a second subset of the first subset of friction clutches, wherein the second subset includes fewer clutches than the first subset.

2. The vehicle transmission of claim 1 wherein switching the selectable one-way clutch from the passive state to the active state is performed in response to selection of a reverse mode by a vehicle driver.

3. The vehicle transmission of claim 1 wherein the component fault comprises a fault of at least one of the plurality of friction clutches to engage when commanded.

4. The vehicle transmission of claim 1 wherein the component fault comprises a speed sensor fault.

5. The vehicle transmission of claim 1 wherein a second subset of the first subset of friction clutches having one less element than the first subset establishes a full tie-up condition.

6. The vehicle transmission of claim 5 wherein the controller is further programmed to, in response to the vehicle being in motion, command engagement of the first subset of the friction clutches after the vehicle comes to rest.

7. The transmission of claim 1 wherein the controller is further programmed to detect the component fault based on a speed sensor reading inconsistent with a commanded clutch engagement state.

8. A vehicle transmission comprising:
a plurality of friction clutches;
an output brake;
a selectable one-way clutch; and
a controller programmed to switch the selectable one-way clutch from a passive state to an active state, responsive to a component fault, by commanding engagement of the output brake and a first subset of the friction clutches to establish a slip elimination state, then commanding the selectable one-way clutch to the active state, wherein in the passive state, the selectable one-way clutch prevents relative rotation between two components on each side in one direction while permitting relative rotation between the two components in an opposite direction, and wherein in the active state the selectable one-way clutch prevents relative rotation between the two components in either direction.

9. The vehicle transmission of claim 8 wherein the controller is further programmed to release a second subset of the first subset of the friction clutches after commanding the selectable one-way clutch to the active state.

10. The vehicle transmission of claim 8 wherein the controller is further programmed to release the output brake after commanding the selectable one-way clutch to the active state.

11. The vehicle transmission of claim 8 wherein the output brake comprises a parking pawl.

12. The transmission of claim 8 wherein engagement of the output brake causes a full tie-up condition.

13. The vehicle transmission of claim 8 wherein the controller is further programmed to, in response to vehicle being in motion, command engagement of the output brake and the first subset of the friction clutches after the vehicle comes to rest.

14. A vehicle transmission comprising:
a plurality of friction clutches;
an output brake;
a selectable one-way clutch;
at least one speed sensor to output a signal indicative of a speed across the selectable one-way clutch; and
a controller programmed to change state of the selectable one-way clutch by
in an absence of a component fault, commanding the selectable one-way clutch from a passive state to an active state only after sensing the speed across the selectable one-way clutch is less than a predetermined threshold, wherein in the passive state, the selectable one-way clutch prevents relative rotation between two components on each side in one direction while permitting relative rotation between the two components in an opposite direction, and wherein in the active state, the selectable one-way clutch prevents relative rotation between the two components in either direction, and
in response to detection of the component fault, commanding engagement of at least one of a first subset of the friction clutches and the output brake to establish a slip elimination state before commanding the selectable one-way clutch to the active state.

15. The vehicle transmission of claim 14 wherein the controller is further programmed to, in response to the component fault being a fault of the at least one speed sensor, command engagement of the selectable one-way clutch after establishment of the slip elimination state without regard for the output from the speed sensor.

16. The vehicle transmission of claim 14 wherein the controller is further programmed to detect the component fault based on the signal from the speed sensor being inconsistent with a commanded clutch engagement state.

17. The vehicle transmission of claim 14 wherein the controller is further programmed to, in response to the vehicle being in motion, command engagement of the first subset of the friction clutches after the vehicle comes to rest.

18. The vehicle transmission of claim 14 wherein a second subset of the first subset of friction clutches having one less element than the first subset establishes a full tie-up condition.

19. The vehicle transmission of claim 14 wherein the controller is further programmed to release a second subset of the first subset of friction clutches after commanding the selectable one-way clutch to the active state.

* * * * *